(12) United States Patent
Frebourg et al.

(10) Patent No.: US 12,552,701 B2
(45) Date of Patent: Feb. 17, 2026

(54) DEVICE AND METHOD FOR SHAPING A GLASS SHEET

(71) Applicant: SAINT-GOBAIN GLASS FRANCE, Courbevoie (FR)

(72) Inventors: Philippe Frebourg, Senlis (FR); Gaëtan Sciacchitano, Ermont (FR); Thibault Rapenne, Noyon (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 135 days.

(21) Appl. No.: 18/550,812

(22) PCT Filed: Mar. 11, 2022

(86) PCT No.: PCT/FR2022/050441
§ 371 (c)(1),
(2) Date: Sep. 15, 2023

(87) PCT Pub. No.: WO2022/195204
PCT Pub. Date: Sep. 22, 2022

(65) Prior Publication Data
US 2024/0158278 A1    May 16, 2024

(30) Foreign Application Priority Data

Mar. 15, 2021 (FR) ...................................... 2102519

(51) Int. Cl.
*C03B 23/03* (2006.01)
*B32B 17/10* (2006.01)
(Continued)

(52) U.S. Cl.
CPC .... *C03B 23/0305* (2013.01); *B32B 17/10036* (2013.01); *B32B 17/10816* (2013.01);
(Continued)

(58) Field of Classification Search
CPC .. C03B 23/03; C03B 23/0305; C03B 23/0357
See application file for complete search history.

(56) References Cited

U.S. PATENT DOCUMENTS 4,229,199 A * 10/1980 Seymour ................. C03B 35/24
65/273
4,496,386 A    1/1985 Hymore et al.
(Continued)

FOREIGN PATENT DOCUMENTS

| CN | 1311761 A | 9/2001 |
| CN | 1572734 A | 2/2005 |

(Continued)

OTHER PUBLICATIONS

First Office Action as issued in Chinese Patent Application No. 202280002752.4, issued on Feb. 21, 2024.
(Continued)

*Primary Examiner* — Scott W Dodds
(74) *Attorney, Agent, or Firm* — Pillsbury Winthrop Shaw Pittman LLP

(57) ABSTRACT

A bending station for a bending device, includes two bending molds, a pressing frame arranged to adapt to the glass sheet and to press it against an upper mold, the upper mold including a molding face, the area of which, defined by projecting the contour of the upper mold onto a horizontal plane, is greater than the area defined by projecting the outer contour of the pressing frame and the glass sheet onto the same horizontal plane, the pressing frame including a pressing ring having a continuous surface, the upper mold including a flexible sheet associated with an upper series of translational elements, wherein the upper mold is able to deform under the effect of the translational elements of the upper series in order to obtain a deflection value varying by at least 5 mm.

27 Claims, 11 Drawing Sheets

(51) Int. Cl.
*C03B 23/035* (2006.01)
*C03B 40/00* (2006.01)

(52) U.S. Cl.
CPC ........ *B32B 17/10935* (2013.01); *C03B 23/03* (2013.01); *C03B 23/0357* (2013.01); *C03B 40/005* (2013.01); *B32B 2250/40* (2013.01); *B32B 2315/08* (2013.01)

(56) References Cited

U.S. PATENT DOCUMENTS

| | | | | |
|---|---|---|---|---|
| 4,741,751 A | * | 5/1988 | Claassen | C03B 23/0302 65/273 |
| 4,806,140 A | * | 2/1989 | Krug | C03B 23/0302 65/273 |
| 4,830,650 A | | 5/1989 | Kelly | |
| 5,649,990 A | * | 7/1997 | Frank | C03B 23/0305 65/273 |
| 5,849,056 A | * | 12/1998 | May | C03B 23/0305 65/273 |
| 2002/0189290 A1 | * | 12/2002 | Bennett | C03B 35/202 65/273 |
| 2011/0302964 A1 | * | 12/2011 | Nitschke | C03B 23/0254 65/106 |

FOREIGN PATENT DOCUMENTS

| | | |
|---|---|---|
| EP | 2 580 170 A1 | 4/2013 |
| EP | 2 580 170 B1 | 7/2019 |
| WO | WO 03/064337 A1 | 8/2003 |
| WO | WO 2011/156058 A1 | 12/2011 |

OTHER PUBLICATIONS

International Search Report as issued in International Patent Application No. PCT/FR2022/050441, dated Jun. 27, 2022.

Third Party Observation as issued in European Patent Application No. 22713979.7, dated May 22, 2025.

* cited by examiner

[fig 1]
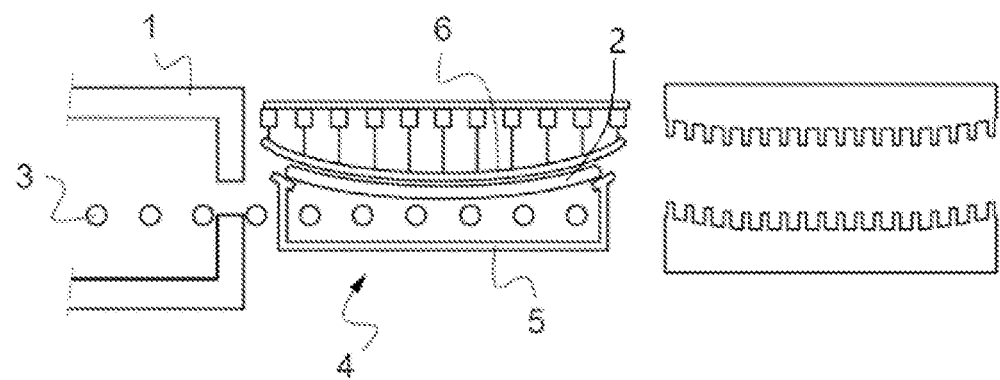
[fig 2]
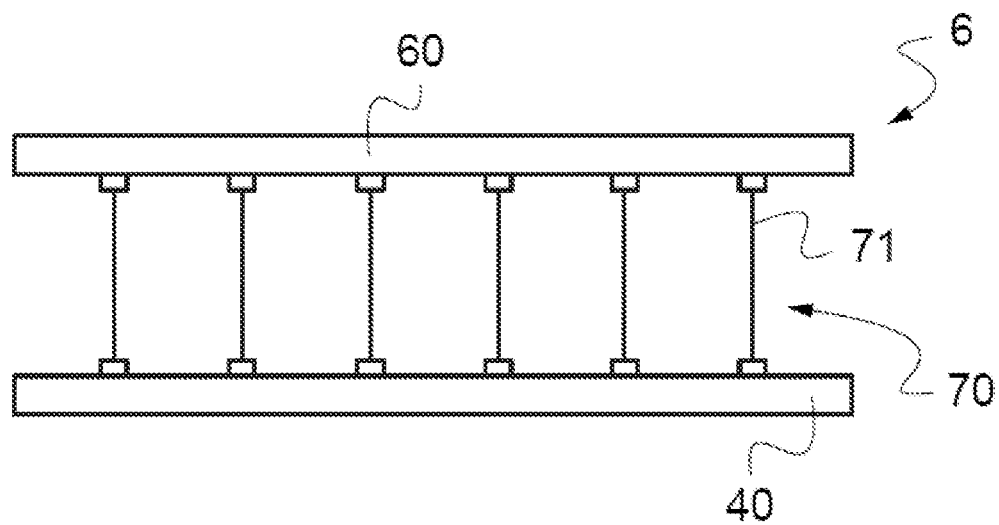

[fig 2']
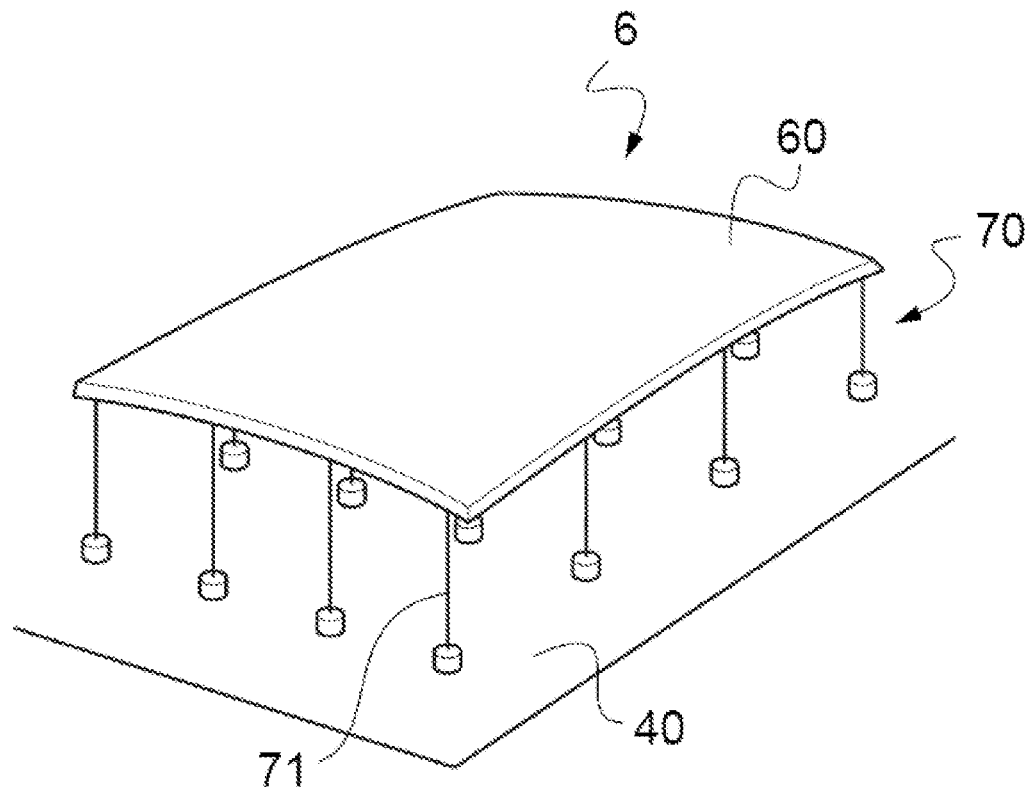
[fig 3]
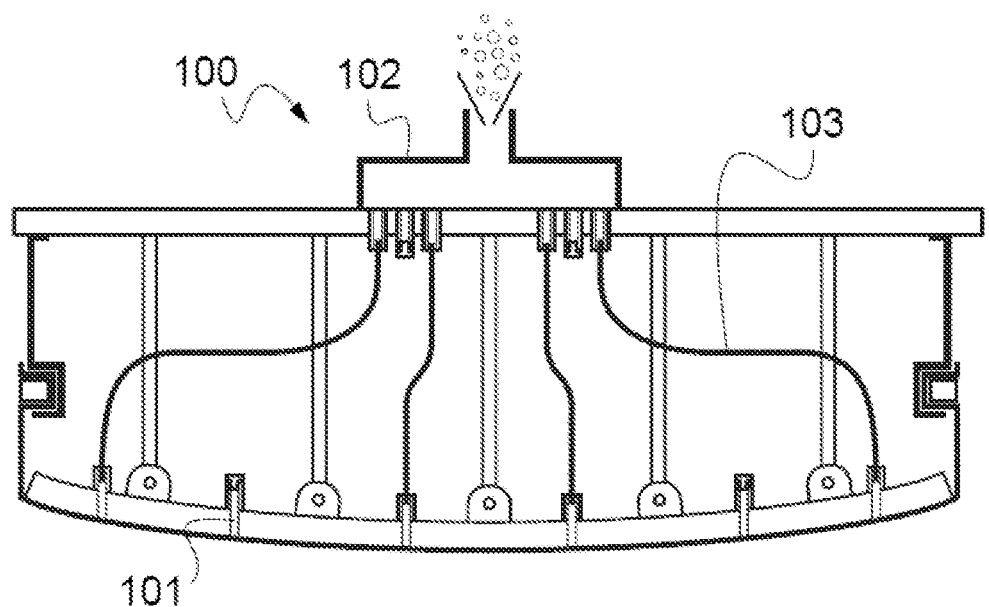

[fig 4]
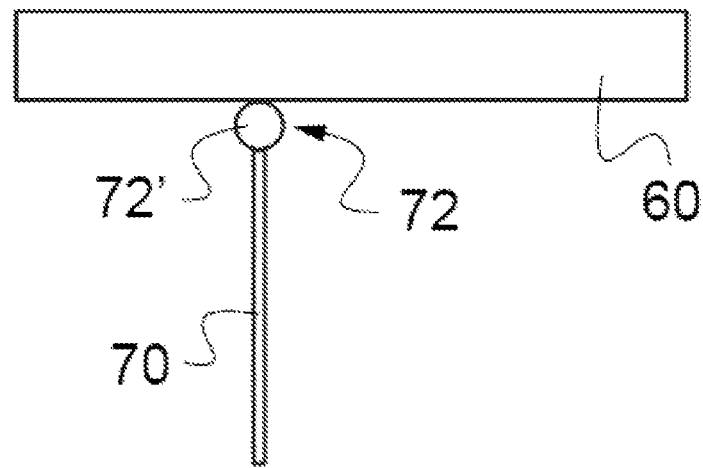
[fig 4']
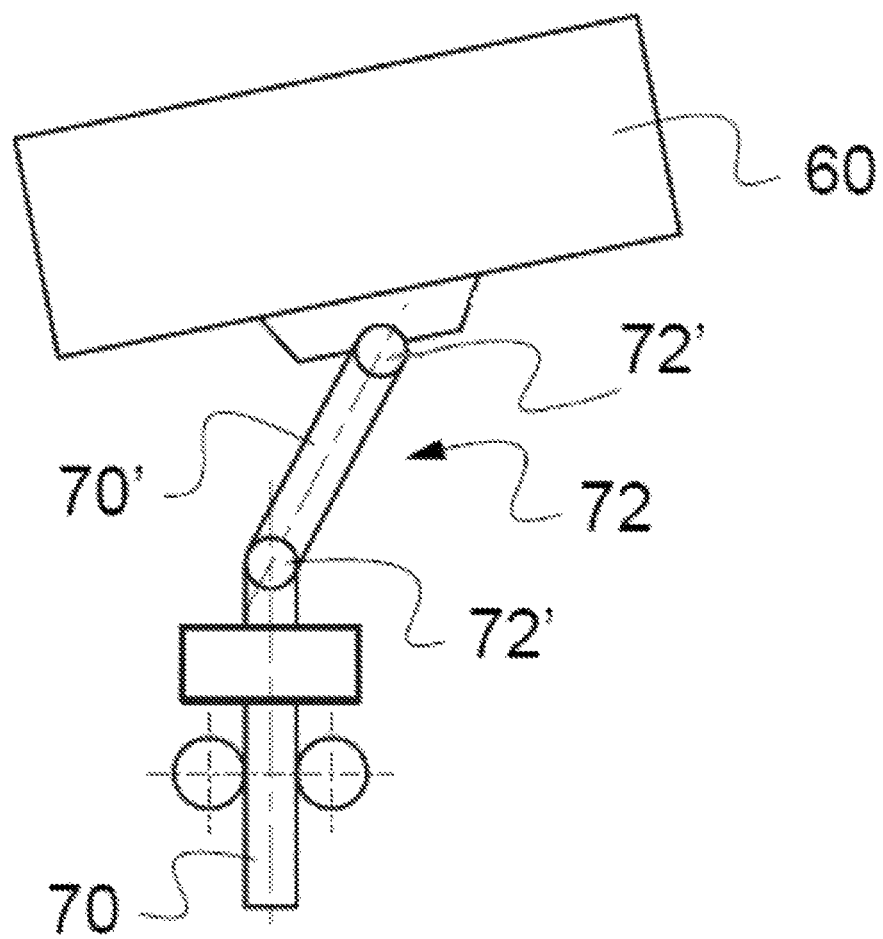

[fig 5]
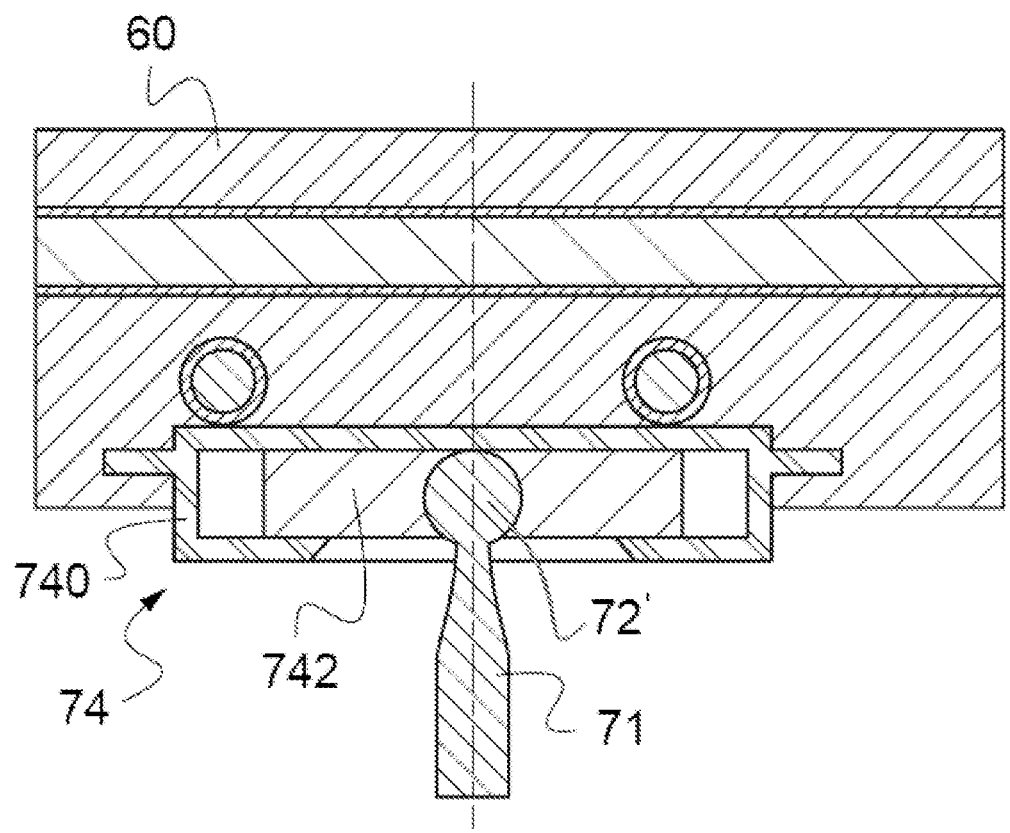

[fig 5']
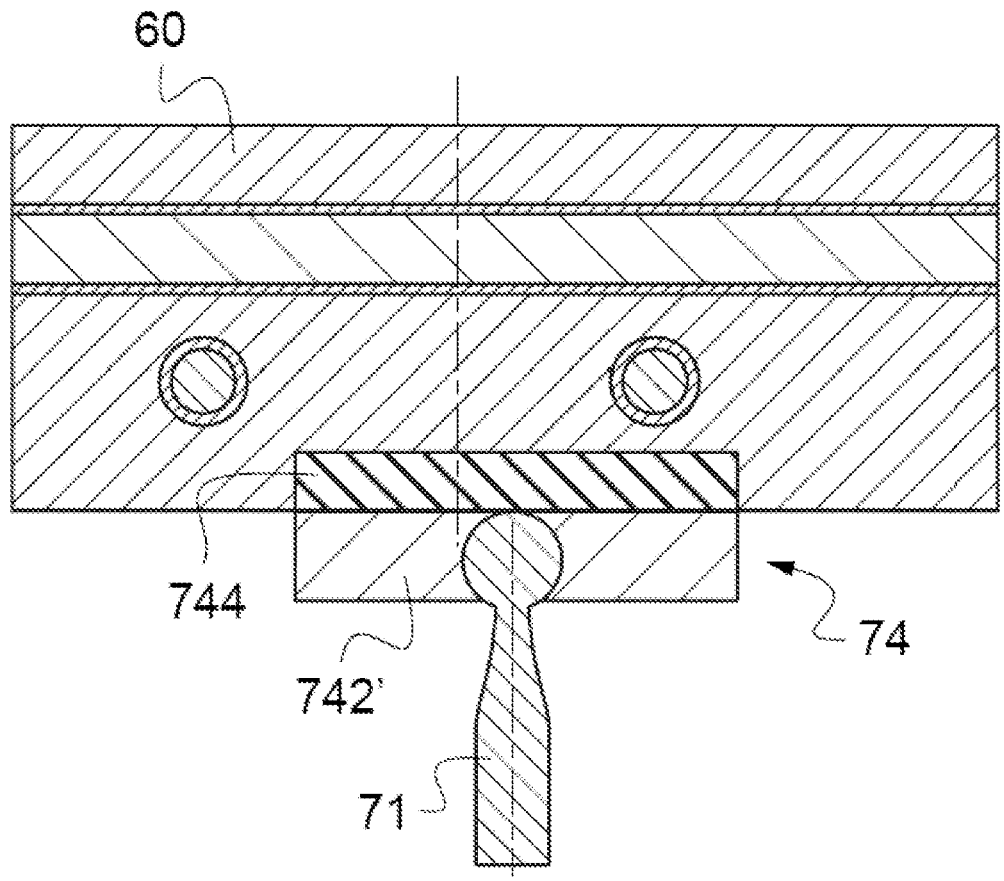
[fig 6]
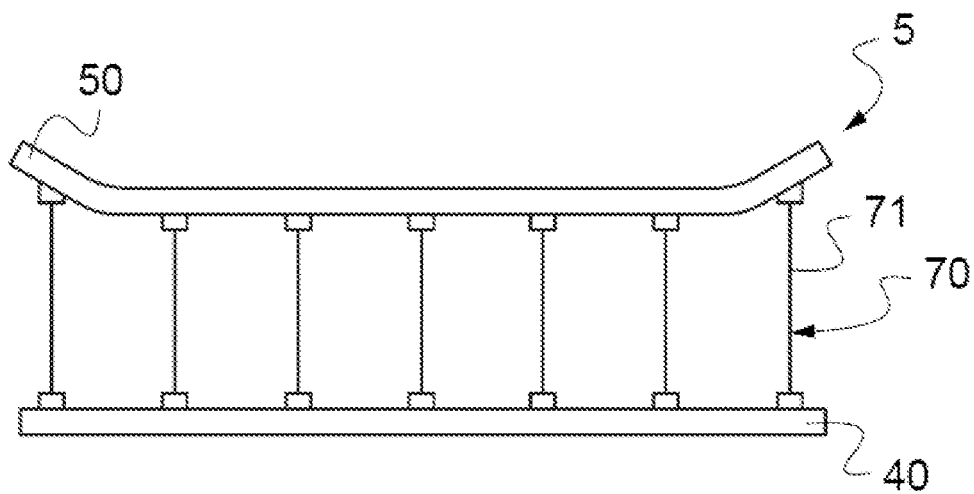

[fig 6']
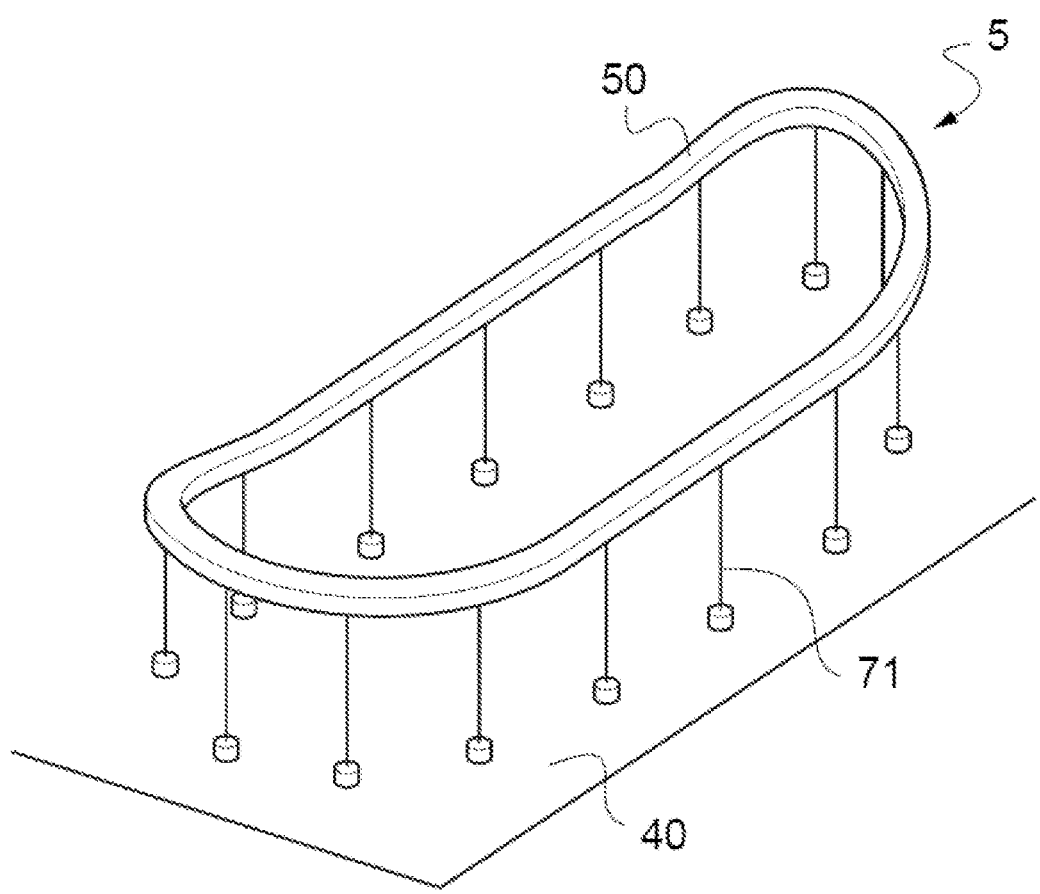

[fig 7]
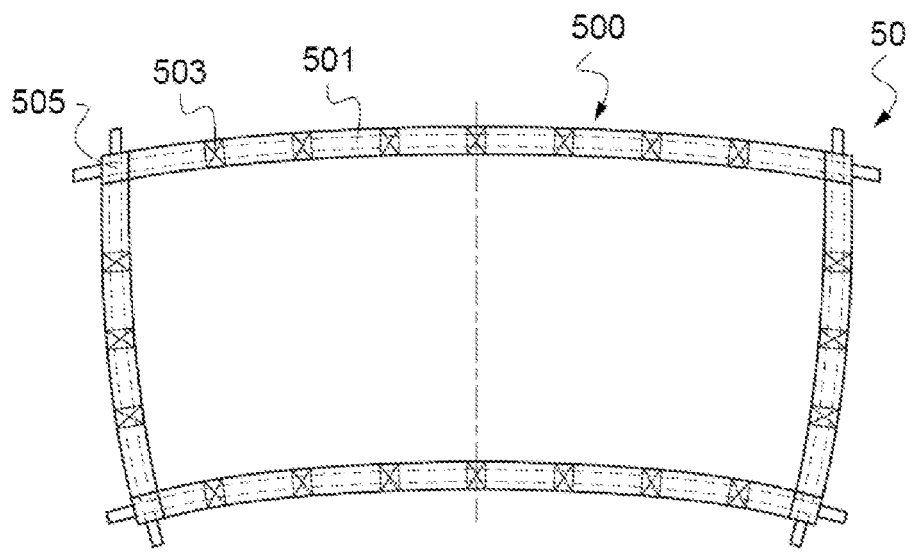
[fig 8]
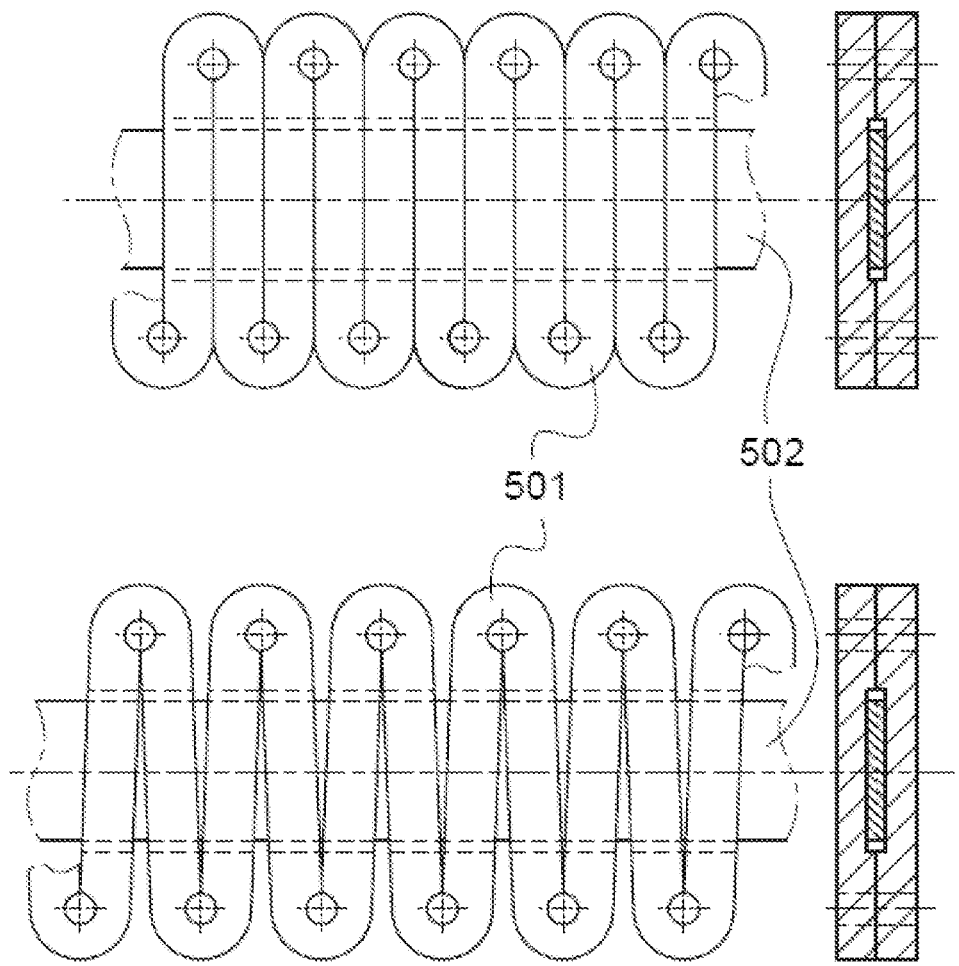

[fig 9]
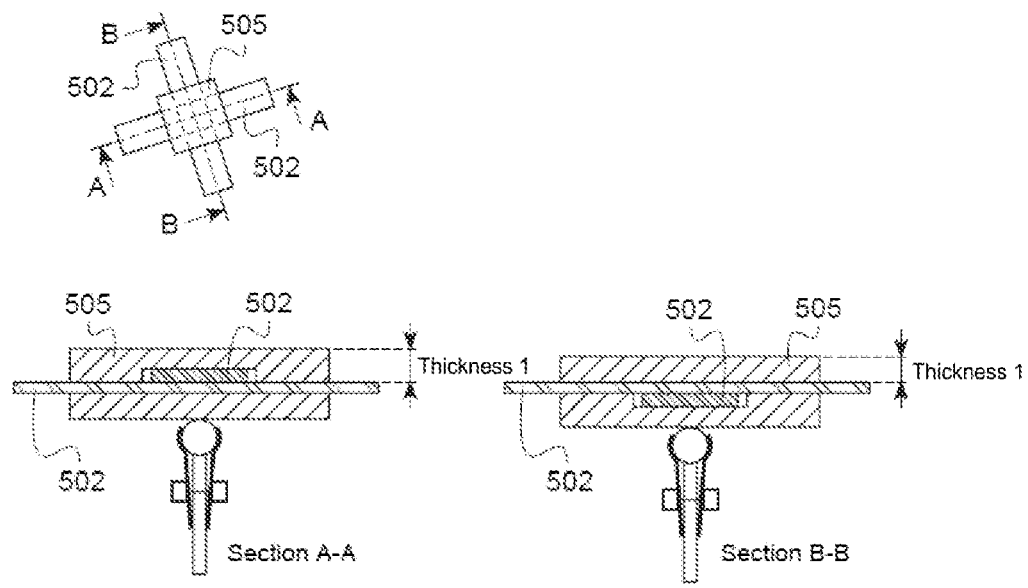
[fig 10]
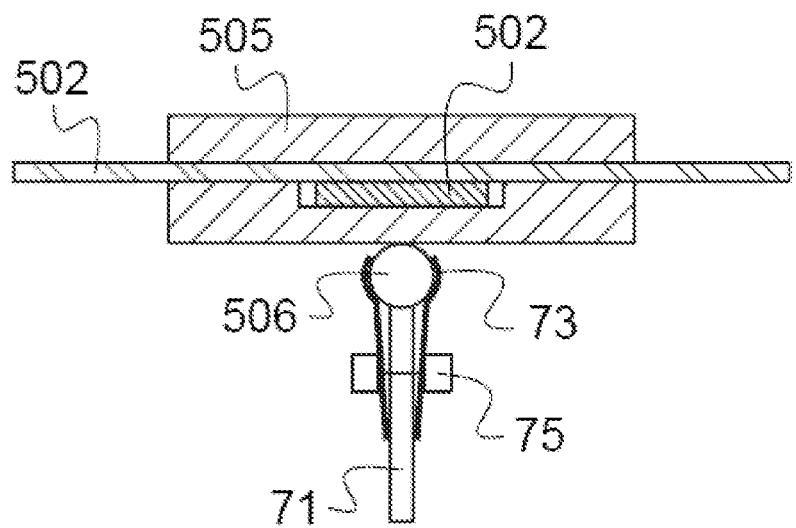

[fig 11]
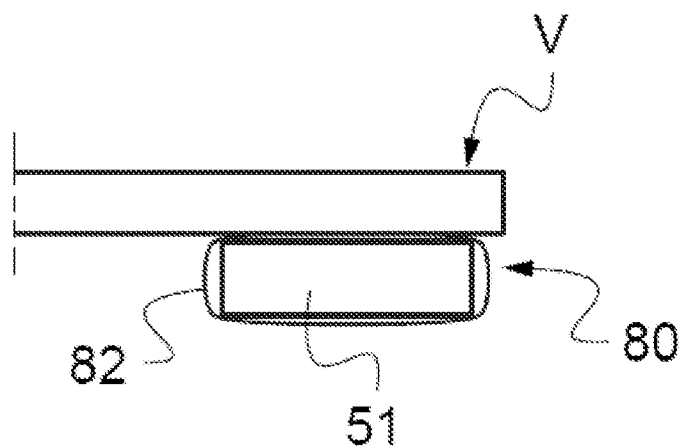
[fig 12A]
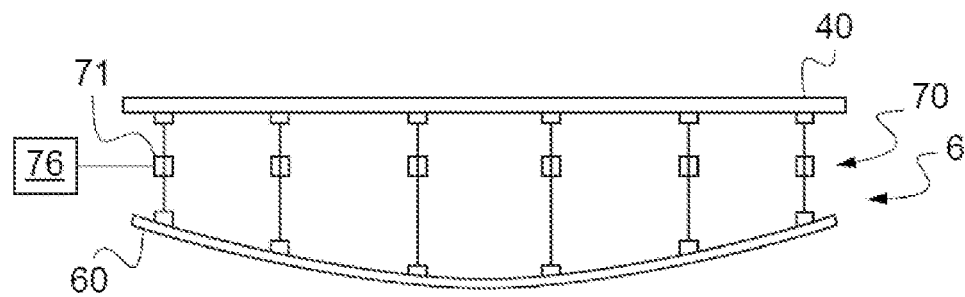
[fig 12B]
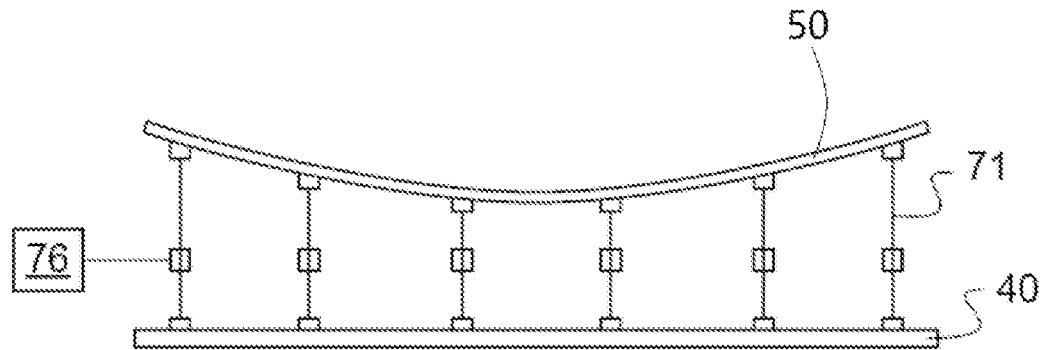

[fig 14]
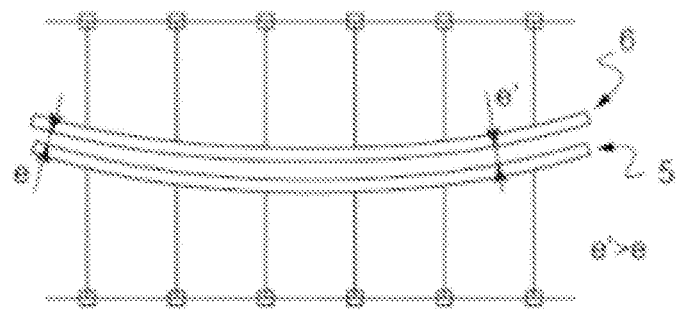
[fig 15]
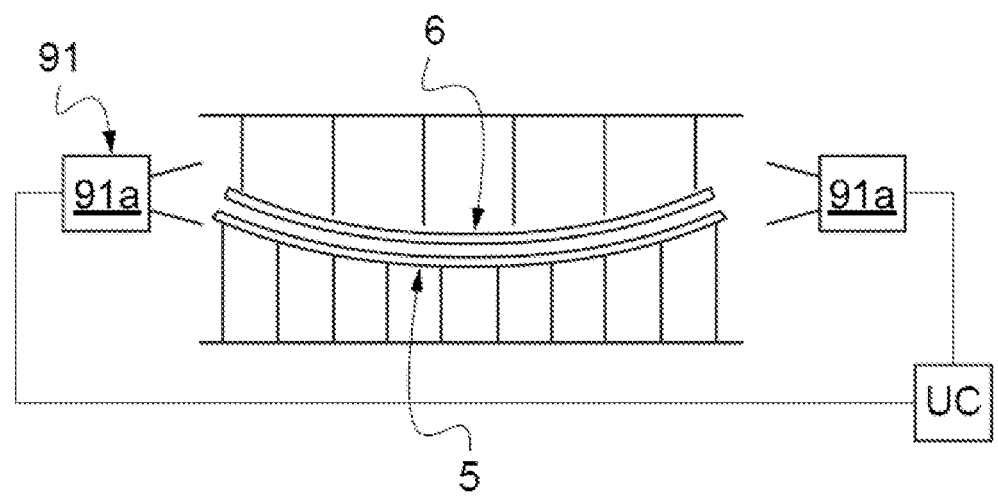
[fig 16]
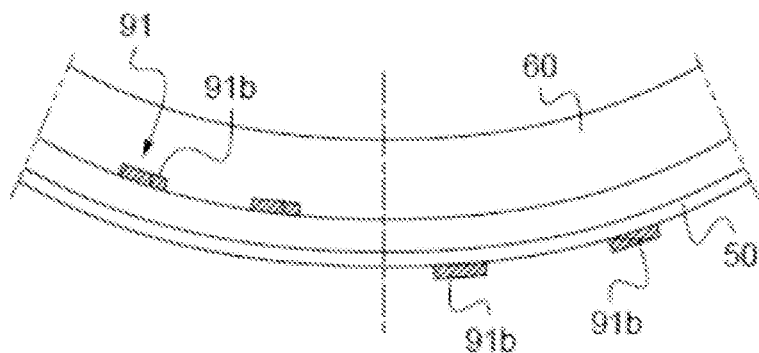

DEVICE AND METHOD FOR SHAPING A GLASS SHEET

CROSS-REFERENCE TO RELATED APPLICATIONS

This application is the U.S. National Stage of PCT/FR2022/050441, filed Mar. 11, 2022, which in turn claims priority to French patent application number 2102519 filed Mar. 15, 2021. The content of these applications are incorporated herein by reference in their entireties.

The invention relates to a technique for bending a glass sheet, followed by a step of cooling. The technique according to the invention is either suited to bending a glass sheet which is intended particularly to be tempered, or to bending glass sheets which are subsequently cooled then assembled in pairs to form a laminated glazing.

PRIOR ART

Several techniques are used to give a shape to a glass sheet. Among these techniques, one consists in having glass sheets which are conveyed one by one through a heating furnace to raise the temperature thereof to a temperature close to the softening temperature, with the glass sheets being conveyed on a roller bed. The glass sheets are subsequently transported, as soon as they leave the furnace, to a bending station. In the bending station, the glass sheet is raised off the conveyor by a frame having the shape which it is desired to give to the glass sheet. This frame is commonly referred to as "pressing frame" or "pressing ring". Depending on the configuration of the roller bed, the frame is continuous or discontinuous so as to be able to pass through the roller bed on which the glass sheet initially lies. The frame subsequently raises the glass sheet and presses it against a solid upper mold, the shape of which matches the shape of the frame and therefore corresponds to the desired shape for the glass sheet. After pressing, the glass is suctioned and held against the mold, then it is released either onto the roller bed or another frame referred to as transfer frame, for transfer to the cooling or tempering zone. In the former case, the rollers then begin to move again, to transport the glass sheet to the tempering station.

Aside from the particular feature of the lower frame which passes through the roller bed which serves as conveyor, this type of technique is characterized by the fact that the bending operation takes place outside the furnace, or at the very least in a chamber kept at a high temperature. "High temperature" is intended to mean temperatures typically of greater than 250-300° C. This type of technique should therefore be considered to be a glass shaping technology by cold pressing, with this qualifier defining the location of the bending station outside a chamber kept at a high temperature: in this configuration, controlling the position of the bending tools is simpler than in the case of hot technologies. On the other hand, the bending method is a race against time because, as soon the glass sheet leaves the furnace, it cools down; as a result, modifications to the bending operation or its conditions are tricky and limited.

One disadvantage of this method is that the upper mold and the frame are specific parts. This means that, for each glass shape, the upper mold and the frame have to be machined to the precise dimensions of the glass shape to be produced. It is also possible that, for the same shape or surface, a plurality of upper molds are necessary due to the thickness or the color of the glass. The upper mold is rigid, and the frame generally has adjusting screws which give it a deformability limited to approximately +/−5 mm. Thus, it is only possible to adjust the lower mold.

It is also possible to make modifications to the upper mold by re-machining the surface thereof, which operation is referred to as "re-machining" and which can modify its geometry over a thickness ranging from a few tenths of a millimeter to approximately 15 millimeters. Thus, each glass shape requires its own tools, involving significant cost. Indeed, during development, the compromise of the parameters of the method may lead to modifying the geometry of the mold so as to be able to obtain the correct final geometry for the glazing. This re-working of the tools is costly financially and in terms of time. This cost can be increased if several production lines are used to manufacture said glass, each production line requiring its own tools.

SUMMARY OF THE INVENTION

One aim of the present invention consists in solving the problems of the prior art by providing a device for shaping a glass sheet and the method thereof, enabling a far greater flexibility of operation and particularly making it possible to shape sheets having different shapes and/or surfaces.

To this end, the present invention relates to a bending station for a bending device, comprising two bending molds, a pressing frame arranged to adapt to the glass sheet and to press it against an upper mold, the upper mold comprising a molding face, the area of which, defined by projecting the contour of the upper mold onto a horizontal plane, is greater than the area defined by projecting the outer contour of the pressing frame and the glass sheet onto the same horizontal plane, the pressing frame comprising a pressing ring having a continuous surface, the upper mold comprising a flexible sheet associated with an upper series of translational elements, the upper mold is able to deform under the effect of the translational elements of the upper series in order to obtain a deflection value varying by at least 5 mm.

The invention also relates to a bending station for a bending device, comprising two bending molds, a pressing frame arranged to adapt to the glass sheet and to press it against an upper mold, the upper mold comprising a molding face, the area of which, defined by projecting the contour of the upper mold onto a horizontal plane, is greater than the area defined by projecting the outer contour of the pressing frame and the glass sheet onto the same horizontal plane, the pressing frame comprising a pressing ring having a continuous surface associated with a lower series of translational elements, the upper mold comprising a flexible sheet associated with an upper series of translational elements, the upper mold and the pressing frame are able to deform under the effect of the translational elements in order to obtain a deflection value varying by at least 5 mm.

The invention also relates to a bending station for a bending device, comprising two bending molds, a pressing frame arranged to adapt to the glass sheet and to press it against an upper mold, the surface area or area of which, defined by projecting the contour of the upper mold onto a horizontal plane, is at least equal to the surface area or area defined by projecting the outer contour of the pressing frame, the pressing frame comprising a pressing ring having a continuous surface associated with a lower series of translational elements, the pressing frame is able to deform under the effect of the translational elements of the lower series in order to obtain a deflection value varying by at least 5 mm.

The advantage of the bending station according to the invention is to enable, by acting on the translational elements, the upper mold and/or the pressing frame to shape glass sheets for single or laminated glazing having different shapes, or sheets having the same shape but different thicknesses.

According to one example, the area of the molding face of the upper mold is equal to at least 101% of the surface area of the glass sheet to be molded, preferably at least 105% and even more preferably at least 110%.

According to one example, the area of the molding face of the upper mold is such that it has a distance of at least 1 cm, preferably of at least 5 cm, between a portion of an edge of the upper mold and a portion of the edge of the glass sheet.

According to one example, the translational elements of the upper series of translational elements and/or the lower series of translational elements are actuators.

According to one example, the translational elements of the upper series of translational elements and/or the lower series of translational elements comprise a hinging means.

According to one example, the hinging means is a ball joint arranged between the end of a translational element and the upper mold or the pressing frame.

According to one example, the hinging means comprises a connecting rod equipped with a ball joint at each end thereof; a first ball joint connects the end of the translational elements to the connecting rod while a second ball joint connects the other end of the connecting rod to the upper mold or to the pressing frame.

According to one example, the ball joint attached to the upper mold or to the pressing frame is attached via a compensating means able to move in translation, said compensating means comprising a runner mounted so as to move in a cage, said cage being attached to the upper mold and said runner being attached to a translational element, or comprising a magnetic runner in contact with the upper mold, which upper mold has been made at least locally magnetic.

According to one example, the upper mold is made at least locally magnetic by magnetic inserts or by a metal structure installed during the production (casting) of the membrane.

According to one example, the flexible sheet of the upper mold is a polymer membrane or a metal sheet provided with a plurality of open notches.

According to one example, the polymer membrane is reinforced by stiffening means.

According to one example, the stiffening means comprise overmolded rods or a sheet made from a stiffer material overmolded on or adhesively bonded to the polymer membrane, or rods inserted into sheaths overmolded in the polymer membrane, with the rods being able to slide in the sheaths.

According to one example, the pressing ring is made from a polymer material or comprises a metal sheet provided with a plurality of openings of open notches.

According to one example, the pressing ring comprises portions each comprising a plurality of stretchable segments separated from one another by plates, each portion further comprising a prong which is inserted into a suitable bore formed in each plate and stretchable segment of the portion, said pressing ring further comprising intersection plates comprising two bores enabling the insertion of the prongs from two portions.

According to one example, the upper mold and/or the pressing frame is covered with a metal knit or fabric.

According to one example, the translational elements of the upper series and/or of the lower series are manually adjusted in translation.

According to one example, the translational elements of the upper series and/or of the lower series are connected to a control unit enabling the adjustment thereof in vertical translation.

According to one example, the translational elements of the upper series and of the lower series are connected to a computation unit enabling the adjustment thereof in vertical translation in an interconnected manner.

According to one example, a suction device is arranged, this suction device comprising a vacuum box comprising an outlet connected to a pump and a plurality of inlets, said suction device further comprising a plurality of pipes each connected to an inlet of the vacuum box and to a through-hole arranged in the upper mold.

According to one example, each pipe is connected to a through-hole of the upper mold via a manual tap valve or a module with a controllable valve.

The invention further consists of a bending device comprising a furnace for heating a glass sheet, a device for supporting and transporting the glass sheet in a substantially horizontal plane passing through the furnace, to a bending station according to the invention.

The present invention also relates to a method for bending a glass sheet comprising heating the glass sheet to a softening temperature, transporting the glass sheet along a substantially horizontal trajectory to a bending station according to the invention, shaping the glass sheet by pressing between the two molds.

According to one example, the method further comprises, before the shaping, a step consisting in acting on the translational elements of the upper series of translational elements and/or of the lower series of translational elements in order to adjust the upper mold and/or the pressing frame.

According to one example, said device further comprises measuring means making it possible to measure the space between the surface of the upper mold and the surface of the pressing frame, said measuring means being connected to a computation unit in order to send a signal to the first series of translational elements and/or the second series of translational elements in order to compensate for potential drift.

According to one example, said device further comprises measuring means making it possible to compare the shape of the curved glass to a reference, said measuring means being connected to a control unit in order to send, during production, a signal to the first series of translational elements and/or the second series of translational elements in order to compensate for potential drift of the curved shape and/or of the optical quality in reflection of the curved shape.

The invention also relates to a method for producing a series of laminated glazings, each laminated glazing comprising a first sheet and a second sheet associated with an interlayer film, said method comprising the steps of:
Providing glass sheets,
Shaping the glass sheets with the bending device according to the invention in order to obtain a series of first glass sheets and a series of second glass sheets;
Combining the first glass sheets, the second glass sheets and interlayer films in order to form the laminated glazings,
Characterized in that the step of shaping the glass sheets is carried out so that alternately at least one first glass sheet and at least one second glass sheet are formed.

According to one example, the step of shaping the glass sheets comprises repeating the following steps:

Acting on the translational elements of the upper series and/or of the lower series in order to adjust the bending station to the shaping of the first glass sheet or the second glass sheet;

Shaping at least one first glass sheet or at least one second glass sheet;

Acting on the translational elements of the upper series and/or of the lower series in order to set the bending station to the shaping of the second glass sheet or the first glass sheet;

Shaping at least one second glass sheet or at least one first glass sheet.

DESCRIPTION OF THE FIGURES

Other particular features and advantages will become clear from the following description thereof, given by way of indication and entirely nonlimitingly, with reference to the appended drawings, in which:

FIG. 1 represents a bending station according to the invention.

FIGS. 2 and 2' represent a turned over bending mold for the bending station according to the invention.

FIG. 3 represents an upper mold provided with a suction device.

FIGS. 4, 4', 5, 5' represent hinging means for the upper mold and/or the pressing frame.

FIGS. 6 and 6' represent a pressing frame for the bending station according to the invention;

FIGS. 7, 8, 9 and 10 represent a configuration of a pressing ring for the bending station according to the invention FIG. 11 represents interfacing means between the glass and the pressing frame or the upper mold of the bending station according to the invention.

FIGS. 12a and 12b represent a bending mold and a pressing ring, which are controllable;

FIGS. 14, 15 and 16 represent measuring means making it possible to improve the bending.

DETAILED DESCRIPTION

Figure 13:
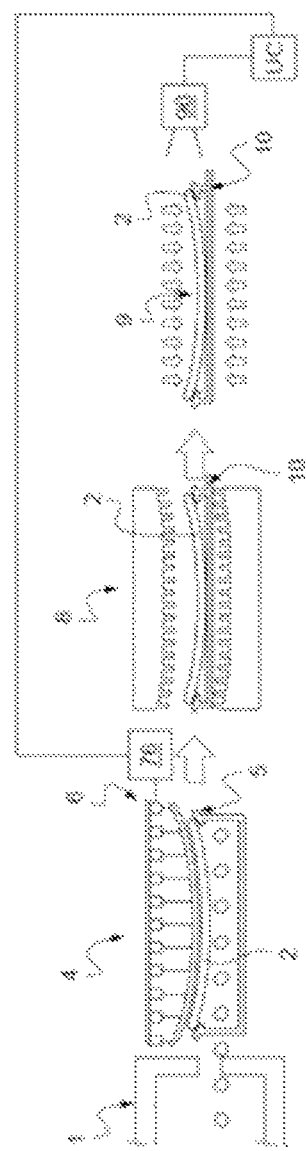
FIG. 13 represents the bending station and a bending line.

FIG. 1 represents a furnace 1 in which a glass sheet 2 passes over a roller conveyor 3. While in the furnace 1, the glass sheet 2 is brought to its softening temperature. The glass sheet 2 is subsequently transported, still supported by the conveyor 3, to a bending station 4.

This bending station 4 is the location at which the softened glass sheet is manipulated to assume virtually its definitive shape.

In the bending station 4, a pressing frame 5 is arranged under the plane defined by the roller conveyor 3. When the glass sheet 2 arrives above this frame, members, not shown in the figures, make it possible to ensure precise positioning of said glass sheet, then its movement is stopped by stopping the rollers in the bending zone. The pressing frame 5 then passes through the roller bed 3 to raise the glass sheet.

As mentioned previously, the pressing frame 5 has the shape which it is desired to give the glass sheet, and makes it possible to shape the glass sheet. The pressing frame 5 is designed to be able to pass through the roller bed 3.

With the pressing frame 5 having taken charge of the glass sheet 2, it moves to press the latter against a bending mold 6 positioned above the pressing frame 5. The glass sheet is therefore shaped by pressing the glass sheet between the bending mold 6 and the pressing frame 5. At the end of the pressing, a suction system makes it possible to perfectly press the glass sheet against the upper mold.

The bending mold 6 (also referred to as upper mold) comprises a bending face which is preferably solid, that is continuous and uniform, the shape of which is preferentially square but which can have other shapes, such as rectangular or any shape at all. The bending mold has a surface area or an area, defined by projecting the contour of the upper mold onto a horizontal plane, at least equal to the surface area or area defined by projecting the outer contour of the pressing frame.

Cleverly, according to the invention, the bending mold 6 and/or the pressing frame 5 are arranged to make it possible to shape glass sheets of different shapes.

In a first embodiment, the bending mold 6 is adaptable. This means that the bending mold 6 is such that it makes it possible to shape glass sheets of different shapes. To this end, the bending mold 6 comprises a flexible sheet 60 associated with an upper series of translational elements 70 as can be seen in FIGS. 2, 2', where this bending mold 6 is represented inverted or turned over. This makes it possible for the flexible sheet to have a deflection height which varies from 5 to 500 mm, preferably from 10 to 300 mm, and even more preferably from 20 to 200 mm.

Cleverly, the bending mold 6 is universal; that is, it has a larger surface area than that of the glass sheet and that of the surface area of the pressing frame 5. This means that the surface area or area defined by projecting the contour of the bending mold (also referred to as upper mold) onto a horizontal plane is greater than the surface area or area defined by projecting the outer contour of the pressing frame and the glass sheet onto the same horizontal plane. Preferably, the surface area of the bending mold 6 is equal to at least 101% of the surface area of the glass sheet, preferentially at least 105% of the surface area of the glass sheet, and even more preferably at least 110%. Furthermore, it is preferable to have a minimum distance of at least 1 cm, preferably of at least 5 cm, between at least one portion of the edge of the glass sheet and a portion of the edge of the membrane. This configuration enables the upper mold 6 to be used for different shapes of glass sheet, as long as the shape thereof fits inside that of the upper mold 6.

The flexible sheet 60 may have several forms. The first is a membrane made from a polymer material. This membrane made from a polymer material may optionally comprise rigid elements which improve strength. If the polymer material is too flexible, there is a risk that the shape of the membrane cannot be well controlled. By stiffening said membrane, this control is improved. These rigid elements can be metal or plastic rods inserted into or overmolded in the membrane. These rigid elements can also be a metal sheet attached to said membrane. The rigid elements can optionally be inserted into sheaths which are overmolded in the membrane. The presence of these sheaths enables the rigid elements to freely slide in the sheaths.

In a second form, the flexible sheet 60 comprises a thin sheet made from a material which is resistant to temperatures of 700 degrees, that is which does not soften at this temperature. Preferentially, the material is a metal or an alloy thereof. This thin sheet is provided with a plurality of openings in the form of repeated open notches over the surface of the thin sheet, in order for the latter to be able to deform in two different directions.

In a variant which can be seen in FIG. 3, the bending station 4 comprises a suction device 100 at the upper mold 6, this suction device 100 making it possible to suction a glass sheet.

To this end, the suction device 100 comprises a plurality of through-holes 101 arranged in the upper mold 6. In order to provide the suction force, the suction device comprises a vacuum box 102. This vacuum box 102 comprises an outlet, via which it is connected to a pump (not shown) so that the air from said box 102 can be suctioned off.

The vacuum box 102 also comprises a plurality of inlets, each connected to a through-hole in the membrane. This connection is produced by pipes 103, one end of which is connected to an inlet of the vacuum box 102 and the other end of which is connected to the through-hole 101 at the face opposite to the face facing the glass sheet.

The holes are preferably distributed evenly over the surface of the upper mold 6.

Given that the upper mold 6 is said to be universal, that is, it can be used for different shapes of glass sheet, it is possible that not all of the holes 101 are used. In order to prevent these holes 101 leading to a loss of suction, the unused holes 101 are preferably plugged or connected in pairs. They can be plugged using a plug or equipped with a module with a controllable valve which can be closed or opened as required. An alternative embodiment consists in equipping each pipe 103 with a ¼ (quarter) turn-type tap valve making it possible to sever the connection between the vacuum box 102 and the atmosphere in the event that the hole 101 of the membrane connected to this pipe is outside the contact surface between the membrane and the glass sheet.

The flexible sheet 60 is associated with an upper series of translational elements 70. These translational elements 70 are actuators 71. An actuator 71 is defined as a mechanical or electromechanical element allowing the translation of two elements in relation to each other.

An actuator 71 can thus be in the form of a cylindrical tube in which a mobile piston is arranged, with a fluid making it possible to move the piston.

An actuator 71 can also be in the form of a screw-nut assembly or a worm screw.

These translational elements 70 are attached, by a first end, to a base which may be in the form of a plate or a frame. The second end of the translational elements 70 is attached to the flexible sheet 60, as can be seen in FIG. 2.

Each translational element 70 of the supper series can be controlled independently, making it possible to locally deform said flexible sheet 60 and giving it the desired shape within the limits of deformability of the flexible sheet 60.

Since it is a universal tool adapted to shaping a large number of shapes of glazings, the flexible sheet 60 has the following characteristics: its area is larger than the area of a main face of the shaped glass sheet, and the contour of the glass sheet is contained within the contour of the flexible sheet. More specifically still, the contour of the upper face (face in contact with the flexible sheet) of the shaped glass sheet is contained in the lower surface (face in contact with the glass sheet) of the flexible sheet.

The density of the translational elements 70 can vary based on the desired surface area but also on the radius of curvature. This density can be such that the translational elements are arranged according to a grid of 500×500 mm to 50×50 mm.

The pressure applied to the glass sheet held between the pressing frame 5 and the bending mold 6 does not mean that the shape of the glass sheet is fixed. Since the glass sheet has not necessarily entirely cooled down during the shaping, the shape of said glass sheet can still be changed slightly.

Increasing the curvature leads to the appearance of stresses on the translational elements 70 or on the flexible sheet 60.

Indeed, increasing the curvature tends to reduce the dimensions of the surface of the glass projected onto a horizontal plane, while the projection of the translational elements 70 is independent of the geometry of the upper mold 6. Stresses are exerted on the translational elements 70 and on the upper mold 6. They can lead to a deformation thereof and therefore to poor operation. However, the translational element 70 should remain as vertical as possible in order to function correctly.

One solution to prevent the appearance of such stresses consists in providing each translational element 70 with one or more hinging means 72, as can be seen in FIG. 4.

In a first example which can be seen in FIG. 4, the hinging means 72 is (are) in the form of a ball joint 72' arranged at the end of the translational element 70. This ball joint 72' is composed of a sphere and a complementary female form with the shape of a hollow sphere. The ball joint 72' is thus arranged between the translational element and the flexible sheet 60.

In a second example which can be seen in FIG. 4', the hinging means 72 is in the form of a connecting rod 70' equipped with a ball joint 72' at each end thereof. Each ball joint 72' is composed of a sphere and a complementary female form with the shape of a hollow sphere. As shown in FIG. 4', the first ball joint 72' connects the end of the vertical rods of the translational elements 70 to the connecting rod 70', while the other one connects the other end of the connecting rod 70' to a base plate integral with the flexible sheet 60.

An alternative consists in arranging the ball joint 72' at the interface between the upper mold 6 and the translational element 70 which is able to slide. This means that the ball joint 72' is able to move slightly at the surface via a compensating means 74, as shown in FIG. 5.

A first embodiment of the compensating means 74 consists of a cage 740 wherein a runner 742 can move freely. The runner 742 is a circular part. The cage 740 comprises a circular base from which an annular wall extends. Starting from the annular wall, a peripheral flange extends toward the axial center of the circular base and defines a housing wherein the runner 742 can be inserted. The peripheral flange is such that, once the runner 742 has been inserted, it cannot leave the cage. The diameter of the circular base and the height of the annular wall of the cage are dimensioned such that the runner 742 can translate freely within the cage 740 along 2 directions, parallel to the plane containing the base of the cage 740.

The cage 740 is attached to the upper mold 6. The cage 740 can be attached to the membrane by adhesive bonding or, in the case of an upper mold 6 in the form of a membrane, it can be directly overmolded in the membrane.

The runner 742 is attached to the translational element 70 such that, during the shaping of the flexible sheet 60, the runner 742 can move in the cage to compensate the stress which may appear. The runner 742 is designed to enable the attachment of a ball joint 72'. This ball joint 72' is attached directly to the end of the actuator.

In a second embodiment which can be seen in FIG. 5', the translational elements 70 are attached to the flexible sheet 60 via a compensating means 74 in the form of a magnetic runner 742'. To this end, the flexible sheet 60 is itself at least locally magnetic. This magnetism is obtained in various ways.

A first way consists in having the whole of the surface of the flexible sheet 60 be magnetic. To this end, the flexible sheet 60 can be made from a magnetic material, such as a flexible metal sheet pierced with a pattern to give this sheet a sort of flexibility. The flexible sheet may also be in the form of a sheet of non-magnetic flexible material, such as a polymer which is made magnetic via an insert made from magnetic material extending over the whole surface thereof.

A second way consists in locally providing the membrane with magnetic zones, these magnetic zones being placed at locations where the translational elements have to be connected to the membrane. To this end, magnetic inserts 744 are attached to the flexible sheet 60. This attachment may be adhesive bonding or screwing, particularly when the flexible sheet 60 is a metal sheet, but it can be an overmolding, particularly when the flexible sheet is a polymer membrane.

The runner 742' is designed to enable the attachment of a ball joint. This ball joint is attached directly to the end of the actuator 71 or to the connecting rod 70'.

In one configuration, each translational element 70 is attached to the upper mold 6 by hinging means 72 using two ball joints 72' and a connecting rod 70'. Other configurations are nonetheless possible.

Thus, another configuration consists in arranging translational elements 70 at the center of the upper mold 6, which translational elements do not comprise a connecting rod 70' associated with two ball joints 72, unlike the translational elements 70 arranged at the periphery, but rather are equipped with a single ball joint 72'. Indeed, if all the translational elements 70 had two ball joints 72', there would be too many degrees of freedom present for certain geometries. Thus, for surfaces with a small curvature, there is a risk that the system lacks strength. In the configuration with translational elements 70 arranged in the center provided with a single ball joint 72', this risk is reduced.

According to a second embodiment, the pressing frame 5 is adaptable. The pressing frame comprises a pressing ring 50. This pressing ring 50 is continuous and is connected to a lower series of translational elements 70, as shown in FIGS. 6, 6'. The translational elements 70 are actuators 71 like those described previously. These translational elements 70 are attached, by a first end, to a base 40 which may be in the form of a plate or a frame. The second end of the translational elements 70 is attached to the pressing ring 50.

The pressing ring 50 of this second embodiment is designed to be deformed and to have its curvature modified. This makes it possible for the pressing ring 50 to have a deflection height which varies from 0 to 500 mm, preferably from 0 to 300 mm, and even more preferably from 0 to 200 mm.

To this end, the pressing ring 50 shown in FIG. 6 can be in different forms.

In a first form, the pressing ring 50 is in the form of a ring made from a polymer material such as that used for the bending mold 6.

In a second form, the pressing ring 50 is in the form of an annular metal sheet provided with a plurality of repeated open notches over the surface of the annular metal sheet, in order for the latter to be able to deform in two different directions.

In a third form, the pressing ring 50 is in the form of a structure comprising a plurality of segments attached to one another in order to form a wavy or sinusoidal structure. The segments are arranged to form a ring.

According to a configuration of this third form, the pressing ring 50 comprises a certain number of "sides" or portions 500, each of which can be linear or curved. In the present case, this ring is composed of four "sides" 500, as shown in FIG. 7.

Each side 500 comprises a plurality of stretchable segments or sections 501. Each stretchable section 501 is composed of an elastic material cut in the shape of an accordion, which gives it its significant, and reversible, elongation properties. A rectangular bore is made in the accordion material to allow a flexible non-stretchable prong 502 to slide in a substantially median plane of the accordion, as shown in FIG. 8. This prong 502 gives rigidity to each section 501 and makes it possible to obtain a continuous, regular curve along the whole periphery of the pressing ring 50.

The stretchable sections 501 are separated from each other by rigid sections 503 such as plates; these stretchable sections 501 are attached to the plates 503. Each plate 503 also comprises a bore allowing the non-stretchable prong 502 to slide into it.

The intersection of two adjacent sides 500 is made with an intersection plate 505 provided with two superimposed rectangular bores in order to allow the metal prong 502 to slide on each of the two sides 500, as shown in FIG. 9. These bores have an angle equal to the angle of intersection between the ends of the two adjacent sides that it connects. Each of the two adjacent sides can be inserted therein, as shown in FIG. 9.

The glass therefore comes into contact with the following elements of the pressing ring: the upper surface of each stretchable section 501, the upper surface of each plate 503 and the upper surface of each intersection plate 505.

The bores of an intersection plate 505 are not at the same level, such that there is a bore located closer (distance from bore—contact surface thick. 1) to the contact surface with the glass sheet (referred to as upper bore), and a lower bore. In this case, the upper accordion part of the stretchable section 501 wherein the prong 502 slides, inserted in the upper bore, is thinner than the upper accordion part of the stretchable section 501 wherein the prong 502 slides, inserted in the lower bore. This makes it possible to ensure the edge of the glass is pressed continuously and regularly, which results in making the pressure applied by the lower pressing ring and the upper mold on the edge of the glass uniform. This precaution minimizes the formation of optical defects visible in reflection at the edge of the glass.

The pressing ring 50 is attached to the translational elements via plates 503 and intersection plates 505.

These plates 503 and 505 are equipped with a sphere 506 at the lower surface thereof. Each sphere 506 is in contact with two half-shells 73 installed at the end of each translational element 70 in order to form a ball joint, as shown in FIG. 10.

Each translational element 70 can perform movements along a vertical axis, but the position thereof in the horizontal plane is fixed.

Thus, the pairing formed of a sphere, a plate and double shells integral with the end of the mechanical actuators forms a ball joint connection. A screw-nut type connection 75 makes it possible to block the ball joint in order to make therewith a rigid connection between the actuators 71.

The contact between the glass sheet and the contact surface of the pressing ring 50 may have an angle referred to as relief.

If the relief is zero, then contact between the glass and the pressing ring takes place over a marginal surface of the glass located at the periphery thereof.

On the other hand, non-zero relief makes it possible to have linear contact between the periphery of the glass and the pressing ring 50, which minimizes the geometric and optical defects at the edges of the glazing after shaping.

This relief angle is generally limited by the thickness of the glass to be shaped and also by the marginal length of the pressing ring which is not covered by the glass sheet. The larger the latter is, the thinner the shaped glass is and therefore the smaller the accessible relief is.

For shaping the pressing ring 50, the method consists in loosening the screw-nut connection to enable all the ball joints which connect the pressing ring 50 to the translational systems 70 to be mobile. Then, the actuators 71 or translational elements 70 are set in terms of height so that the plates 503 and intersection plates 505 come into contact with the upper mold 6. The position of the plates 503, 505 is then locked by virtue of the screw-nut pair present at each end of the translational elements 70. In the event that a relief of a given angle is desired, a surface adapted to the upper mold is generated momentarily taking this relief into account, then the previous adjustments are carried out and the screw-nut pairs are blocked, as described previously. The upper mold subsequently assumes a geometry adapted to the shape of the glazings which it is wished to produce, and production can be initiated.

In a variant, the translational elements 70 comprise a connecting rod 70' equipped with a ball joint at each end thereof. Each ball joint may be composed of a sphere and a complementary female form with the shape of a hollow sphere. The first ball joint connects the end of the vertical rods of the translational elements 70 to the connecting rod 70', while the ball joint which connects the other end of the connecting rod and the pressing frame 50 comprises the sphere and the double shells described previously.

In a variant, it is possible to have some translational elements 70 associated with the pressing ring 50 having a hinge with a connecting rod having a double ball joint 72', as explained previously, and others equipped with a single ball joint, which makes it possible to eliminate some degrees of freedom which would make the pressing frame too flexible and not usable. The ends of the translational elements 70 equipped with single ball joints are preferentially located in the middle of the different sides of the pressing ring.

In a variant of the two embodiments, the hinging means 72 for the pressing frame 5 or the upper mold 6 are lockable. To this end, the ball joints 72' are provided with a locking mechanism making it possible to block the position of the ball joint 72'.

In a variant of the two embodiments, the pressing ring 50 and/or a flexible sheet 60 forming the bending mold 6 comprise interfacing means 80, as shown in FIG. 11. These interfacing means 80 are used to improve the contact of said pressing ring 50 and/or of said flexible sheet 60 with the glass sheet V.

The interfacing means 80 may be in the form of a fabric or knit 82, for example based on metal fibers which are resistant to high temperatures. This metal knit or fabric 82 is a material which makes it possible to absorb certain defects and to improve heat exchanges.

With the first embodiment and the second embodiment, it is possible to have several configurations.

The first configuration consists in having the bending mold 6 be adaptable and the pressing ring 5 be stationary. It is thus understood that the bending mold 6 has a deflection height which varies by at least 5 mm and a pressing ring 50, the deflection height of which varies by less than 5 mm. This configuration is advantageous as it makes it possible to reduce costs by having a bending mold 6 which can serve for several shapes of glass sheet.

A second configuration consists in having a stationary bending mold 6 with a surface area or an area, defined by projecting the contour of the upper mold onto a horizontal plane, which is at least equal to the surface area or area defined by projecting the outer contour of the pressing frame and an adaptable pressing ring 50. It is thus understood that the bending mold has a deflection height which varies by less than 5 mm and a pressing ring, the deflection height of which varies by at least 5 mm. This configuration is advantageous as it makes it possible to reduce costs by having a pressing ring which can serve for several shapes of glass sheet.

A third configuration consists in having an adaptable bending mold 60 and an adaptable pressing ring 5. It is thus understood that the bending mold has a deflection height which varies by at least 5 mm and a pressing ring, the deflection height of which varies by at least 5 mm. This third configuration is the most advantageous, because it makes it possible to produce a large number of glass sheets without changing tools.

Thus, the method for shaping a glass sheet according to the invention comprising a step consisting in having glass sheets which are conveyed one by one through a heating furnace to raise the temperature thereof to a temperature close to the softening temperature, with the glass sheets being conveyed on a roller bed.

In a following step, the glass sheets are subsequently transported, as soon as they leave the furnace, to the bending station 4 according to the invention, that is wherein the flexible mold 60 and/or the pressing ring 50 is adaptable.

In the bending station 4, the glass sheet is raised off the conveyor by the pressing ring 50. The pressing ring 50 subsequently raises the glass sheet 2 and presses it against the flexible sheet 60, the shape of which matches the shape of the pressing ring 50 and therefore corresponds to the desired shape for the glass sheet.

After pressing, the pressing ring 50 returns down to a level below the roller bed and thus replaces the glass sheet on said roller bed or on a transport frame 10 which takes the glass sheet to another station. This other station may be a cooling station 9 or tempering station 8, as shown in FIG. 13.

In the case of an adaptable bending mold 6 and/or pressing frame 5, a setting step is necessary. This setting step consists in acting on the upper series of upper translational elements 70 and/or the lower series of translational elements 70 to set the bending mold and/or the shape of the pressing frame.

To this end, a first solution consists in acting manually on these translational elements 70 of the upper series and/or the lower series. Each translational element 70 is thus set manually to obtain the desired bending mold 6 and/or shape of the pressing frame 5.

A second solution consists in acting on the translational elements 70 of the upper series and/or of the lower series via a control unit 76, as shown in FIGS. 12*a* and 12*b*. This control unit 76 is electrically connected to each translational element 70 of the upper series and/or of the lower series, these translational elements 70 being electromechanical. The control unit 76 is provided with, or connected to, an interface (not shown) enabling the operator to enter settings or to load a file comprising said settings. These settings are thus processed in order for a control signal to be sent to each translational element 70 in order to control the translation thereof.

In the case of the upper mold 6 and the pressing frame 5 being adaptable, it is also possible to have an interconnection between the translational elements 70 of the upper series and those of the lower series. This interconnection consists in having a computation unit UC connected to or contained in the control unit 76 which is capable, based on the settings entered for the upper mold 6, to deduce therefrom the settings to be made for the pressing frame 5, and vice-versa.

This setting step is carried out before the shaping of a series of glass sheets, or between each glass sheet.

The method may further comprise a regulating step. This regulating step consists in having measuring means 90 located at the outlet of the bending station 4. These measuring means 90 comprise different sensors, such as an image sensor or a position sensor making it possible to take measurements of the curved sheet and to send the measurements to a computation unit UC, which may be contained in the control unit 76. This computation unit UC compares the measured bent sheet to a theoretical model in order to determine whether they match. If they do not match, the computation unit UC communicates with the control unit 76 in order to send a signal to one or more translational elements 70, making it possible to correct the curved shape.

Indeed, since the bending mold 6 is a surface for which the shape is an approximation of the desired surface geometry of the glass sheet after bending, it is possible to make corrections which make it possible to achieve suitable geometry and also improved optical quality in reflection. The present invention makes it possible to easily achieve this. It is also possible to have measuring means 90 in the form of a check gage associated with optical or position sensors. The gage itself serves as a mechanical reference for the glazing to be measured.

In an alternative, the measuring means 90 make it possible to measure and check the optical quality in reflection of the glass parts produced can advantageously be introduced into this system for controlling the geometry of the upper mold.

This measurement of the optical quality can be carried out alone or in addition to a measurement of the geometry by the measuring means 90.

The method may further comprise an adjustment step. This step is carried out if it is observed that the pressing ring 5 and the bending mold 6 are not in perfect cooperation. Indeed, it is possible that, over the length of the pressing ring, the space e between said ring and the bending mold is not constant, as shown in FIG. 14.

To this end, sensors 91 are used to measure the space between the pressing ring 5 and the bending mold 6. One type of sensor which can be used is a video or image sensor 91a which makes it possible to take an image of the space between the pressing ring 5 and the bending mold 6. The image is sent to a computation unit UC which can be the control unit 76. This computation unit UC uses an algorithm to determine the value of the space e' and compare it to the theoretical space e. This algorithm can use the distance separating the video sensor from the pressing ring 5 and from the bending mold 6, and also optical characteristics of the video sensor. The computation unit UC can then communicate with the control unit 76 in order to send a signal to one or more translational elements 70, making it possible to correct the curved shape. A plurality of sensors are used in order to cover the whole of the pressing ring 5, as shown in FIG. 15.

It is also possible to perform image analysis in reflection after shaping, making it possible to identify over-pressed and under-pressed zones and therefore to request correction of the positions. To this end, a video sensor and a crosshatched pattern are used.

Another type of sensor 91a used may be capacitive or inductive or laser, based on a modification of the capacitance or on the creation of Foucault currents. The sensors 91b, shown in FIG. 16, are thus arranged at the flexible sheet 60 of the bending mold or at the pressing ring 50 and are there to measure the space e between these two. These measurements are sent to a computation unit UC which compares them to a theoretical value in order to send a control signal to one or more translational elements.

Alternatively, the computation unit UC may compare the measurements originating from the sensors. This comparison makes it possible to subsequently act on certain translational elements in order for the measurements to all be identical.

These setting or adjusting steps make it possible to improve the method by limiting the number of curved glasses which do not meet the desired criteria; yield is therefore improved.

Alternatively, the present invention is particularly suitable if it is desired to produce laminated glazings composed of two glass sheets which are perfectly parallel to one another and linked by introducing an elastomer sheet which adheres to the glass and has a uniform thickness.

Indeed, the glazing produced may be composed of two glass sheets having different characteristics such as their thickness or hue. In this case, when production is carried out with identical settings for the two types of glass sheet, two different families of geometry are generally obtained; one for the exterior glass and a second geometry, different from the first, for the interior glass sheet.

Indeed, since these two types of glass sheet have different characteristics, they do not react identically during the shaping process. Thus, it is conventional that glass sheets which are more tinted or thicker give rise to more significant bending than their lighter or thinner counterparts. A conventional means, but one which is difficult to implement, consists in carrying out production in two series: a first series for the exterior glass sheets, for example, then, sequentially, a second series for the interior glass sheets. Such a procedure is difficult to implement and is risky when the geometries of the two glass sheets need to be very close to each other. It also necessitates significant intermediate storage of the first sheets produced, with significant risks of breakage or generation of defects.

The present invention is clever in that it makes possible a method for producing a series of laminated glazings making it possible to produce, consecutively, each pair of interior and exterior glass sheets.

To this end, the computation unit UC acts on the translational elements 70 of the upper series and/or of the lower series in order for the bending mold 6 and/or the pressing frame 5 to be able to alternately shape a glass sheet in order to make a first sheet therefrom, then shape a glass sheet in order to make a second sheet therefrom. This method therefore makes it possible to shape the first sheet and the second sheet of the same laminated glazing virtually simultaneously, such that the temperature conditions for these two glass sheets are identical. This makes it possible to have two glass sheets which cooperate more easily.

Thus, the method for producing a series of laminated glazings therefore comprises the steps of:
Providing glass sheets,
Shaping the glass sheets with the bending device according to the invention in order to obtain a series of first glass sheets and a series of second glass sheets;
Combining the first glass sheets, the second glass sheets and interlayer films in order to form the laminated glazings.

Cleverly, the shaping of the glass sheets is such that it comprises repeating the following steps:
Acting on the translational elements 70 of the upper series and/or of the lower series in order to set the bending station to the shaping of the first glass sheet or the second glass sheet;
Shaping at least one first glass sheet or at least one second glass sheet;
Acting on the translational elements of the upper series and/or of the lower series in order to set the bending station to the shaping of the second glass sheet or the first glass sheet;
Shaping at least one second glass sheet or at least one first glass sheet.

Nonetheless, while the method for producing a series of laminated glazings according to the invention is capable of producing alternately a first glass sheet then a second sheet, it is not limited thereto. Thus, it is possible to adjust the method in order for the bending station to be able to produce a plurality of first sheets, then a plurality of second sheets. The number of first sheets and the number of second sheets may be identical but may be different, such that, for example, two sheets of first sheet type are shaped, followed by three sheets of second sheet type, or vice-versa. The number of first sheets or of second sheets shaped may vary as long as the advantage of having first sheets and second sheets shaped under the same conditions is still present.

The invention describes in particular detail the manufacture of laminated glazing, however this invention also functions for shaping monolithic glass of tempered glazing type.

Of course, the present invention is not limited to the illustrated example but is susceptible to various variants and modifications which will become apparent to the person skilled in the art.

The invention claimed is:

1. A bending station for a bending device, comprising two bending molds comprising a pressing frame and a solid and uniform upper mold, the pressing frame arranged to adapt to a glass sheet and to press the glass sheet against the solid and uniform upper mold, the pressing frame comprising a pressing ring having a continuous surface, the upper mold comprising a flexible sheet associated with an upper series of translational elements, wherein the upper mold comprises a molding face formed by a pressing surface of the flexible sheet, wherein an area of the molding face, defined by projecting a contour of the upper mold onto a horizontal plane, is greater than an area defined by projecting an outer contour of the pressing frame and of the glass sheet onto the same horizontal plane, and wherein the upper mold is adapted to deform under the effect of the translational elements of the upper series in order to obtain a deflection value varying by at least 5 mm, wherein each translational element has a principal actuation axis and a distal end, the distal end being slidably coupled to the flexible sheet by a compensation interface configured to transmit force along the principal actuation axis while permitting relative displacement between the distal end and the flexible sheet by sliding along at least two different directions lying in a plane transverse to the principal actuation axis.

2. The bending station according to claim 1, wherein the area of the molding face of the upper mold is equal to at least 101% of the surface area of the glass sheet to be molded.

3. The bending station according to claim 1, wherein the area of the molding face of the upper mold is such that it has a distance of at least 1 cm between a portion of an edge of the upper mold and a portion of an edge of the glass sheet.

4. The bending station according to claim 1, wherein the translational elements of the upper series of translational elements are actuators.

5. The bending station according to claim 4, wherein the translational elements of the upper series are manually adjusted in translation.

6. The bending station according to claim 4, wherein the translational elements of the upper series of translational elements comprise a hinging means.

7. The bending station according to claim 6, wherein the hinging means is a ball joint arranged between the distal end of each translational element and the upper mold.

8. The bending station according to claim 7, wherein the ball joint attached to the upper mold is attached via the compensating interface, wherein either: said compensating interface comprises a runner mounted so as to move in a cage, said cage being attached to the upper mold and said runner being attached to a translational element, or said compensating interface comprises a magnetic runner in contact with the upper mold, which upper mold has been made at least locally magnetic.

9. The bending station according to claim 8, wherein the upper mold is made at least locally magnetic by magnetic inserts.

10. The bending station according to claim 4, wherein the translational elements of the upper series are connected to a control unit enabling the adjustment thereof in vertical translation.

11. The bending station according to claim 10, wherein the translational elements of the upper series are further connected to a computation unit enabling the adjustment thereof in vertical translation in an interconnected manner.

12. The bending station according to claim 1, wherein the flexible sheet of the upper mold is a polymer membrane or a metal sheet provided with a plurality of open notches.

13. The bending station according to claim 12, wherein the polymer membrane is reinforced by stiffening means.

14. The bending station according to claim 13, wherein the stiffening means comprise overmolded rods or a sheet made from a stiffer material overmolded on or adhesively bonded to the polymer membrane, or rods inserted into sheaths overmolded in the polymer membrane, with the rods being adapted to slide in the sheaths.

15. The bending station according to claim 1, wherein the upper mold and/or the pressing frame is covered with a metal knit or fabric.

16. The bending station according to claim 1, further comprising a suction device comprising a vacuum box comprising an outlet connected to a pump and a plurality of inlets, said suction device further comprising a plurality of pipes each connected to an inlet of the vacuum box and to a through-hole arranged in the upper mold.

17. The bending station according to claim 16, wherein each pipe is connected to a through-hole of the upper mold via a manual tap valve or a module with a controllable valve.

18. A method for bending a glass sheet using the bending station according to claim 1 comprising: heating the glass sheet to a softening temperature, transporting the glass sheet along a substantially horizontal trajectory to the bending station, and shaping the glass sheet into a curved glass by pressing between the two bending molds.

19. The bending method according to claim 18, further comprising, before the shaping, a step consisting of acting on the translational elements of the upper series of translational elements to adjust the upper mold.

20. The bending method according to claim 19, wherein said device further comprises a measuring means to measure a space between the molding face of the upper mold and the continuous surface of the pressing ring, said measuring means being connected to a computation unit in order to send a signal to the upper series of translational elements in order to compensate for potential drift.

21. The bending method according to claim 18, wherein said device further comprises a measuring means to compare a shape of the curved glass to a reference, said measuring means being connected to a control unit in order to send, during production, a signal to the upper series of translational elements to compensate for potential drift of the shape of the curved glass and/or for the optical quality in reflection of the shape of the curved glass.

22. A bending device including the bending station according to claim 1, the bending device further comprising: a furnace for heating a glass sheet, and a device for supporting and transporting the glass sheet in a substantially horizontal plane passing through the furnace, to the bending station.

23. A method using the bending device of claim 22 for producing a series of laminated glazings, each laminated glazing comprising a first sheet and a second sheet associated with an interlayer film, said method comprising:
providing glass sheets,
shaping the glass sheets with the bending device in order to obtain a series of first glass sheets and a series of second glass sheets;
combining the first glass sheets, the second glass sheets and interlayer films in order to form the laminated glazings,
wherein the shaping of the glass sheets is carried out so that at least one first glass sheet and at least one second glass sheet are formed alternately.

24. The production method according to claim 23, wherein the shaping of the glass sheets comprises repeating the following steps:
acting on the upper series of translational elements in order to adjust the bending station for shaping of the at least one first glass sheet;
shaping the at least one first glass sheet;
acting on the upper series of translational elements in order to set the bending station to the shaping of the at least one second glass sheet;
shaping the at least one second glass sheet.

25. A bending station for a bending device, comprising two bending molds comprising a pressing frame and a solid and uniform upper mold, the pressing frame arranged to adapt to a glass sheet and to press the glass sheet against the solid and uniform upper mold, the pressing frame comprising a pressing ring having a continuous surface associated with a lower series of translational elements, the upper mold comprising a flexible sheet associated with an upper series of translational elements, wherein the upper mold comprises a molding face formed by a pressing surface of the flexible sheet, wherein an area of the molding face, defined by projecting a contour of the upper mold onto a horizontal plane, is greater than an area defined by projecting an outer contour of the pressing frame and of the glass sheet onto the same horizontal plane, and wherein the upper mold and the pressing frame are adapted to deform under the effect of the translational elements in order to obtain a deflection value varying by at least 5 mm, wherein each translational element has a principal actuation axis and a distal end, the distal end being slidably coupled to the flexible sheet by a compensation interface configured to transmit force along the principal actuation axis while permitting relative displacement between the distal end and the flexible sheet by sliding along at least two different directions lying in a plane transverse to the principal actuation axis.

26. The bending station according to claim 25, wherein the pressing ring is made from a polymer material or comprises a metal sheet provided with a plurality of openings of open notches.

27. The bending station according to claim 25, wherein the pressing ring comprises a plurality of portions each comprising a plurality of stretchable segments separated from one another by plates, each portion of the plurality of portions further comprising a prong which is inserted into a suitable bore formed in each plate and stretchable segments of the portion, said pressing ring further comprising intersection plates comprising two bores enabling the insertion of the prongs from two portions of the plurality of portions.

* * * * *